United States Patent [19]

Thissen

[11] 3,997,443
[45] Dec. 14, 1976

[54] APPARATUS FOR BIOLOGICAL TREATMENT OF WASTE WATER

[75] Inventor: Christopher Thissen, Austin, Minn.

[73] Assignee: Geo. A. Hormel & Co., Austin, Minn.

[22] Filed: Aug. 21, 1975

[21] Appl. No.: 606,589

[52] U.S. Cl. .................................. 210/150; 261/92
[51] Int. Cl.² ......................................... C02C 1/04
[58] Field of Search .................. 210/17, 150, 151; 261/92

[56] References Cited

UNITED STATES PATENTS

| | | | |
|---|---|---|---|
| 3,266,786 | 8/1966 | Grimer et al. | 261/92 |
| 3,335,081 | 8/1967 | El-Naggar | 210/17 |
| 3,428,555 | 2/1969 | Kitagawa et al. | 210/17 |
| 3,466,241 | 9/1969 | Simpson | 210/151 |
| 3,849,304 | 11/1974 | Torpey et al. | 210/17 |
| 3,869,380 | 3/1975 | Torpey | 210/17 |

Primary Examiner—Thomas G. Wyse
Attorney, Agent, or Firm—Williamson, Bains & Moore

[57] ABSTRACT

An apparatus for the biological treatment of waste water comprises a tank having a plurality of overlapped revolvable, partially submerged, circular discs positioned in the tank. The waste water is caused to flow longitudinally through the tank and along the surfaces of the revolving disc, whereby the waste water will be continuously treated by the aerobic bacteria growing on the surfaces of the discs. The tank is preferably provided with a cover or housed in a building for covering those portions of the biological disc which project above the surface of the water.

6 Claims, 4 Drawing Figures

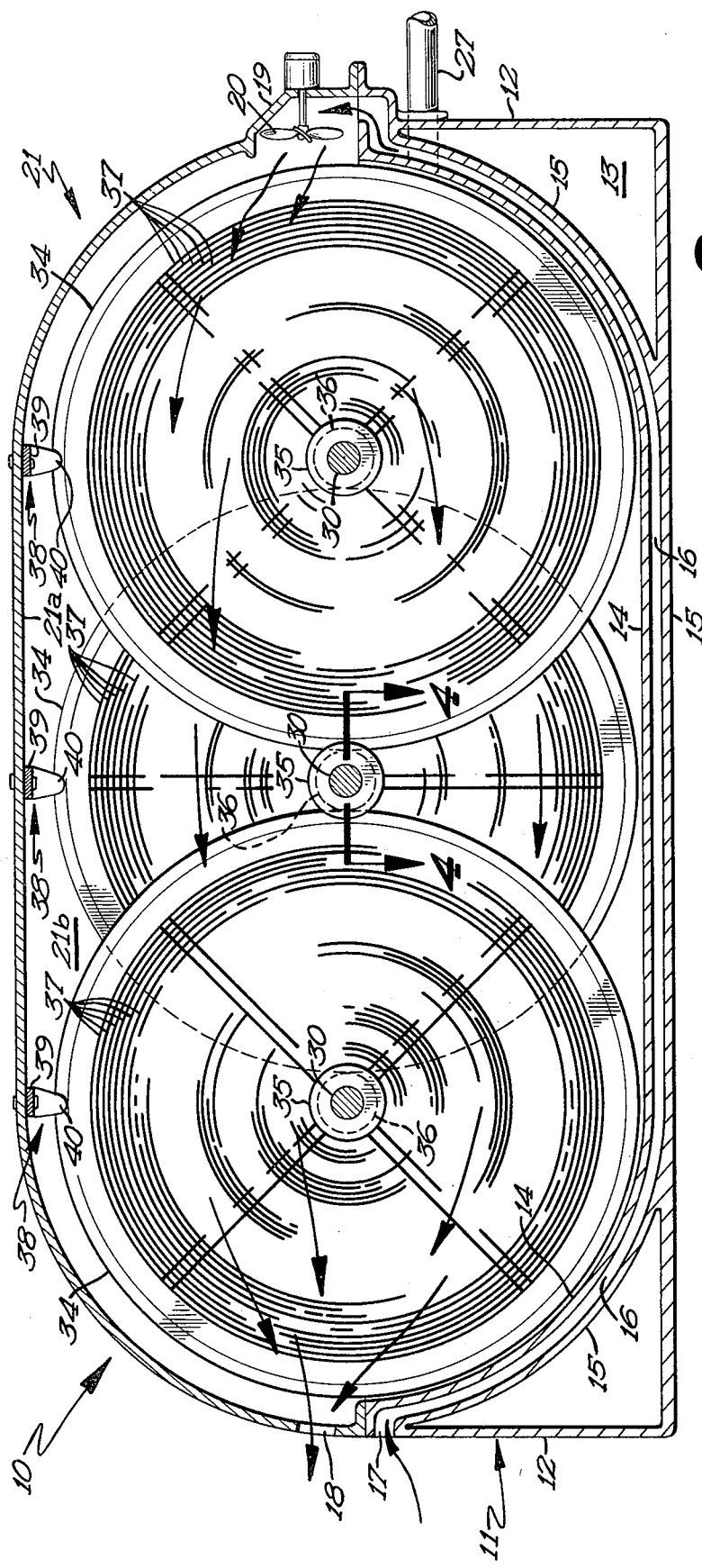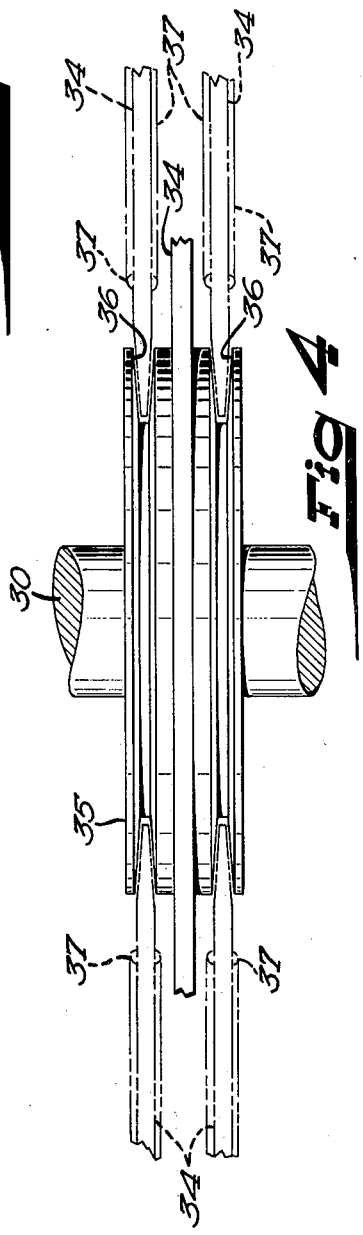

APPARATUS FOR BIOLOGICAL TREATMENT OF WASTE WATER

SUMMARY OF THE INVENTION

This invention relates to apparatus for treatment of waste water, and more specifically, to revolving interlapping disc apparatus for the biological treatment of waste water.

Heretofore, in commercial rotating disc biological treatment systems for waste water, the discs have been arranged longitudinally of the tank which contains the waste water. Therefore, these conventional rotating disc biological systems are quite large and heavy, and are difficult to transport.

It is an object of this invention to provide a biological disc treatment apparatus which includes a plurality of overlapped revolvable discs positioned in the tank, the waste water flowing longitudinally through the tank and along the surfaces of the discs to thereby cause continuous treatment of the waste water as it flows through the tank.

My novel biological disc treatment apparatus provides each tank with substantially more effective biological disc surface area per square foot of tank area from which the aerobic bacteria grows.

These and other objects and advantages of this invention will more fully appear from the following description made in connection with the accompanying drawings, wherein like reference characters refer to the same or similar parts throughout the several views.

FIGURES OF THE DRAWINGS

FIG. 2 is a cross-sectional view taken approximately along line 2—2 of FIG. 1 and looking in the direction of the arrows;

FIG. 4 is a partial enlarged view of a section of the shaft 30 showing the interlocking relationship between the peripheries of the outer discs and the hubs located on the center shaft.

DESCRIPTION OF THE PREFERRED EMBODIMENTS

Figure 1:
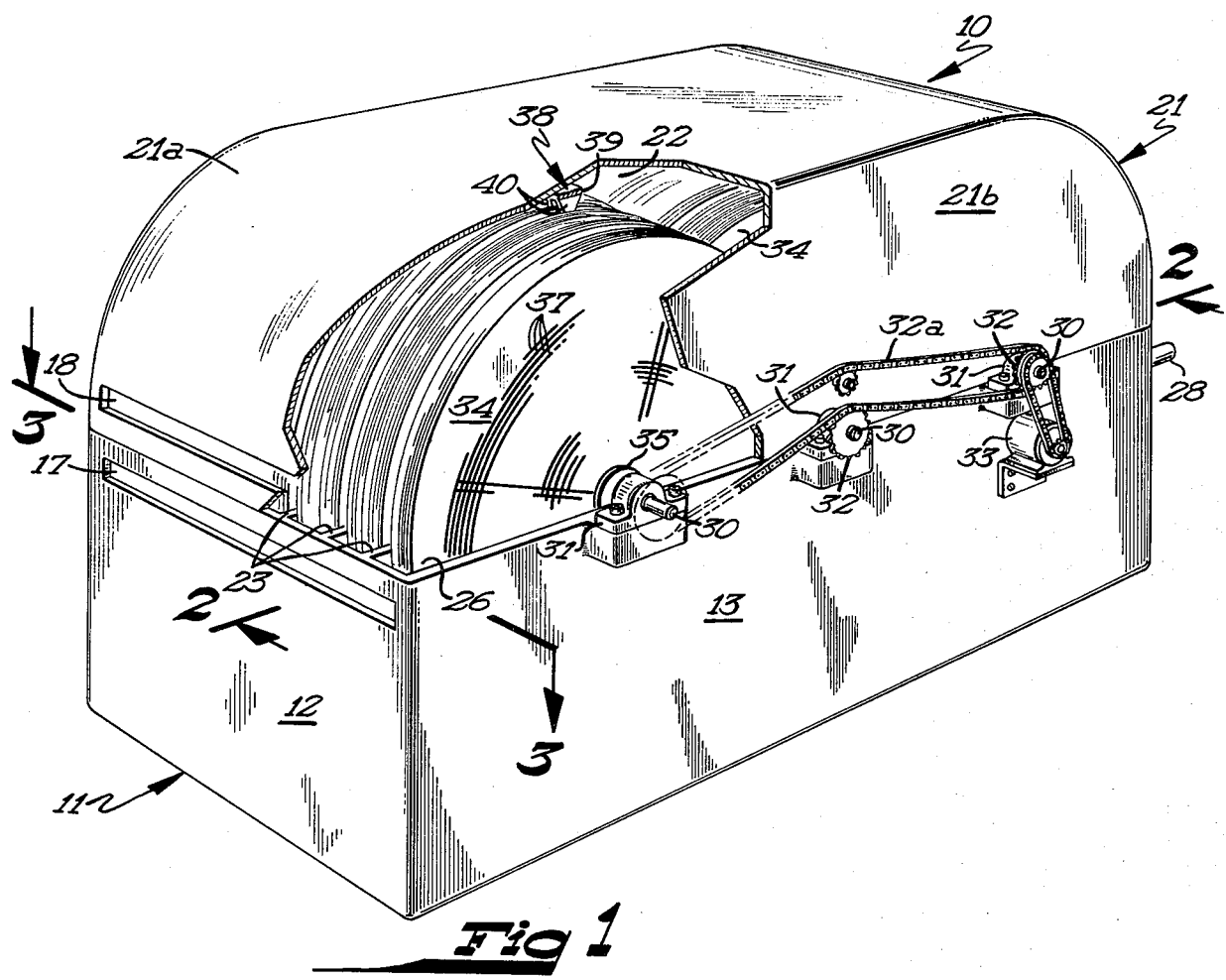
FIG. 1 is a perspective view of the novel waste water treatment apparatus.
Figure 3:
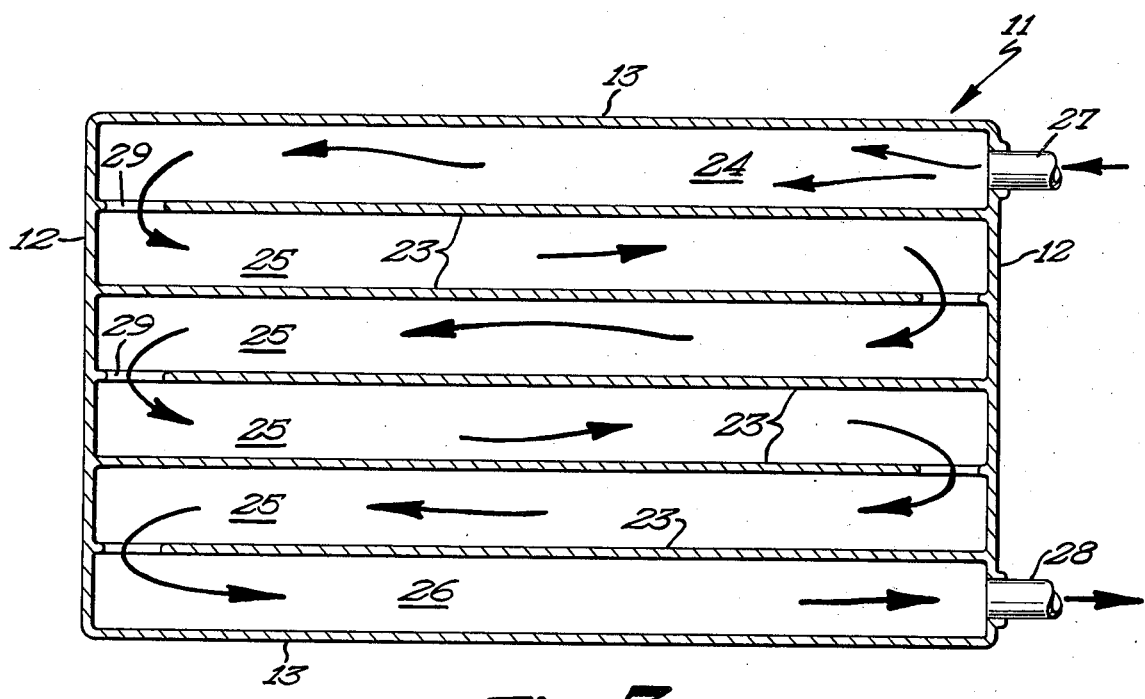
FIG. 3 is a fragmentary cross-sectional view illustrating details of construction of the biological disc.

Referring now to the drawings, and more specifically to FIG. 1, it will be seen that one embodiment of the novel waste water treatment apparatus, designated generally by the reference numeral 10, is there shown. The treatment apparatus 10 is comprised of a tank structure 11 which is of generally rectangular configuration having end walls 12 and elongate side walls 13. The tank is provided with a curved bottom wall 14 which is spaced vertically from a base wall 15 by suitable supports to define a passage 16 therebetween. The tank, including the bottom wall 14, is preferably formed of a metal and an inlet 17 intercommunicates the passage 16 with the exterior. The passage 16 is also provided with an outlet 18 adjacent the other end of the tank structure, and this outlet is connected in communicating relation with a fan chamber 19 having a fan 20 therein. The entire tank structure is preferably provided with a dome-shaped cover 21 having a curved top wall 21a and vertical side walls 21b. The tank 11 is adapted to handle a predetermined volume of waste water and the volumetric space located above the water level and the interior of the cover defines a chamber 22.

The interior of the tank 11 can be provided with a plurality of vertically extending similar partitions 23, each extending from one end wall 12 to a point closely adjacent the opposite end wall. The partitions are disposed in substantially parallel relation with each other and with the side walls 13. These partitions 23 actually separate the interior of the tank 11 into a plurality of compartments, including an inlet compartment 24. A plurality of intermediate compartments 25 and an outlet compartment 26. These compartments are of substantially the same size and in the embodiments shown, the compartments extend longitudinally of the tank.

The inlet compartment 24 is connected by a suitable inlet conduit 27 to a source of waste water to be treated and the outlet compartment 26 is connected by a suitable outlet conduit 28 to permit the treated waste water to flow therethrough. Passage means 29 are also provided to intercommunicate each compartment with the next adjacent compartment and in the embodiments shown, the passage means between each adjacent compartment is located at one end of the tank, the passages being alternately arranged at the ends of the tank. Thus it will be seen that the passage between the inlet compartment and the adjacent intermediate compartment is located remotely with respect to the inlet conduit 27. Thus the water flowing from the conduit 27 into the inlet compartment will flow longitudinally of the compartment before it is directed into the first intermediate compartment.

Similarly, the passage means 29 between adjacent intermediate compartments is located adjacent the end wall 12 having the inlet conduit 27 therein. It will therefore be seen that the passage means between adjacent compartments is alternately located at opposite ends of the compartments so that the waste water to be treated will flow longitudinally through the compartment before it is directed into the next adjacent compartment.

A plurality of elongate shafts 30 extend transversely through the tank 11, each having opposite ends thereof journaled in suitable bearings 31 mounted in the side walls 13. The shafts 30 are disposed in laterally spaced parallel relation with each other and each extends through the compartments and the partitions which define the compartment. One end of each shaft is provided with suitable drive sprockets 32 which are connected by suitable chains 32a to the output shaft and sprocket mounted thereon of a drive system. This drive system may be an electric motor or a hydraulic motor.

Each shaft has a plurality of large circular discs 34 mounted thereon for rotation therewith. The discs 34 are formed of a suitable rigid material such as polystyrene, aluminum, polyethylene or the like, and each is provided with a hub 35 which is keyed to the associated shaft. These biological discs which typically have a diameter of approximately 10 feet are partially submerged in the waste water to an extend approximating one-half of their diameter. It will be appreciated that the diameter is determined by the particular application. It will also be noted that the discs on one shaft are disposed in overlapped relation with respect to the discs on the adjacent shaft.

In this respect, it will be noted that the hub 35 for each disc has a pair of axially spaced apart outwardly opening annular recesses 36 therein, the recesses in each hub being located on opposite sides of the associated disc. These annular recesses 36 of each hub 35 receive therein the peripheral portions of the circular disc on the adjacent shaft. Thus the discs on an adjacent shaft are disposed in overlapped relation to an extent approximating one-half their diameter. The coaction of the peripheral portions of the discs in the annular recesses of the hub of a disc on the adjacent shaft end to center the disc and prevents axial wobble.

In the embodiments shown, each disc is provided with elongate ribs 37 formed on opposite faces thereof, these ribs being arranged in the form of concentric rings and radial lines, and each projecting axially outwardly approximately one-fourth to one-sixteenth of an inch. These ribs serve to prevent adjacent discs from engaging each other in face-to-face relation and provide rigidity for the discs to diminish wobble and fatigue. It will also be noted that each compartment has a plurality of discs mounted therein, and in the embodiments shown, all of the discs are rotated in the same direction but may be rotated in the opposite direction in some applications.

The curved top wall 21a of the cover is provided with a plurality of guide devices 38 each including a bar 39 which is attached to the top wall as best seen in FIG. 2. The bar 39 is provided with a plurality of vertical guide elements 40 which depend downwardly therefrom, the spacing between adjacent guide elements being slightly greater than the thickness dimension of the disc. It will be noted that adjacent guide elements are disposed closely adjacent opposite faces of each disc mounted on a shaft. These guide elements also serve to prevent axial movement of the disc relative to the shaft.

In operation, the circular disc will be rotated at a predetermined velocity which is optimum for growth of biological matter on opposite surfaces of the disc which are used in the biological treatment of waste water. The time each portion of each disc is exposed to the air and is submerged below the surface of the waste water is adjusted for optimum growth of the biological material and for optimum digestion of the waste material in the waste water.

The waste water will be caused to flow longitudinally through each tank or compartment within a tank and along the surfaces of the discs because of the unique arrangement of the inlet, outlet and passage means which intercommunicate the compartments. Since the waste water flows along the surfaces of the overlapped discs, maximum contact of the waste water is obtained with the biological material growing on the disc surface. The lapped relation of the discs also increases the effective surface area of the disc as compared to the conventional rotating disc treatment system. It has been found that the interlapped relation of the disc increases agitation of the biological material growing on the disc surfaces with the waste water. This improved agitation increases contact of the organic material in the waste water with the biological material on the disc surfaces, and increases oxygen diffusion to the biological matter and the waste water itself. The overall effect of this improved process with the interlapped system is a greater organic reduction of the treated waste water as compared to a conventional RBS system having a comparable amount of surface area defined by the rotating disc.

During digestion of the waste material in the waste water, heat is generated since the reaction is usually exothermic. Thus the waste water becomes heated and this enhances the biological activity. However, in colder climates, the waste water is often cooled by the cold air and in such colder climates, the tank is preferably provided with a cover. It is also desirable to aerate the portions of the disc which project above the surface of the water. In the embodiments shown, air is introduced from the outside through the inlet 17 and passes through the passage 16 where it is preheated by a heat exchange action with the heated side lower wall 14 of the tank. Thereafter, the heated air is directed through the outlet and through the fan chamber or by vents to the cover where it is blown into the tank chamber 22 so that the disc and biological material growing thereon is aerated with warm air. This enhances the growth and biological activity of this material.

From the foregoing description, it will be seen that I have provided a novel biological water treatment apparatus which is of compact construction. Because of its compact construction, my novel treatment apparatus may be shipped in an assembled condition, and this is difficult and costly with the conventional system.

Thus it will be seen that I have provided a novel biological waste water treatment apparatus which is not only of simple and inexpensive construction, but one which functions in a more efficient manner than any heretofore known comparable device.

What is claimed is:
1. Apparatus for the biological treatment of waste water comprising:
   a tank adapted to contain a predetermined volume of waste water to be treated,
   an inlet interconnecting the tank with a source of waste water, an outlet connected with said tank,
   a plurality of elongate spaced apart driven shafts extending transversely through and mounted on said tank,
   a plurality of similar biological discs mounted on each shaft for rotation therewith, each of said discs having ribs on opposed surfaces thereof projecting therefrom, said discs being emerged in the waste water to approximately one-half their respective diameters, the spacing between said shafts being such that discs on adjacent shafts are disposed in overlapped relation to approximately one-half their respective diameters, a plurality of over-lapped discs being positioned in each compartment, each disc having a hub affixed to said shaft, the hub of each disc having outwardly opening annular recesses therein receiving therein the peripheral portions of the lapped disc on the next adjacent shaft,
   means for rotating said shaft and the associated discs in the same or opposite direction in a predetermined velocity whereby the surface of the discs are alternately exposed to the waste water and the atmosphere at an interval to permit the growth of aerobic material on the surface of the discs.

2. The apparatus as defined in claim 1 and means defining a plurality of similar partitions in said tank separating the interior thereof into a plurality of similar compartments including an inlet compartment, an intermediate compartment, and an outlet compartment, means defining passages between adjacent ends of adjacent compartments to permit the waste water to flow there between, said passage means being arranged to cause the waste water to flow throughout the length of each compartment, said inlet being connected with said inlet compartment, said outlet being connected with said outlet compartment and being located remotely from the passage means between outlet compartment and the intermediate compartment.

3. The apparatus as defined in claim 1 and a cover for said tank extending upwardly therefrom and covering those portions of the disc which extend above the surface of the water and defining a closed chamber thereat.

4. The apparatus as defined in claim 3 and a passage extending below the lower and side surface of the tank and having an inlet connected with the exterior to permit air to flow beneath and around said tank, said passage having an outlet communicating with said chamber whereby air will be heated as it passes through said passage and will be directed into said chamber.

5. The apparatus as defined in claim 3 and a plurality of guide devices secured to the cover and depending therefrom, said guide devices serving to guide rotative movement of said discs.

6. The apparatus as defined in claim 1 wherein said ribs are of elongate annular configuration and are arranged concentrically with respect to each other.

* * * * *